Feb. 23, 1954 H. H. STEVENS, JR 2,670,065
COMBINED BRAKE AND CLUTCH FOR MOTOR DRIVE
Filed April 7, 1949 3 Sheets-Sheet 1
FIG. 1
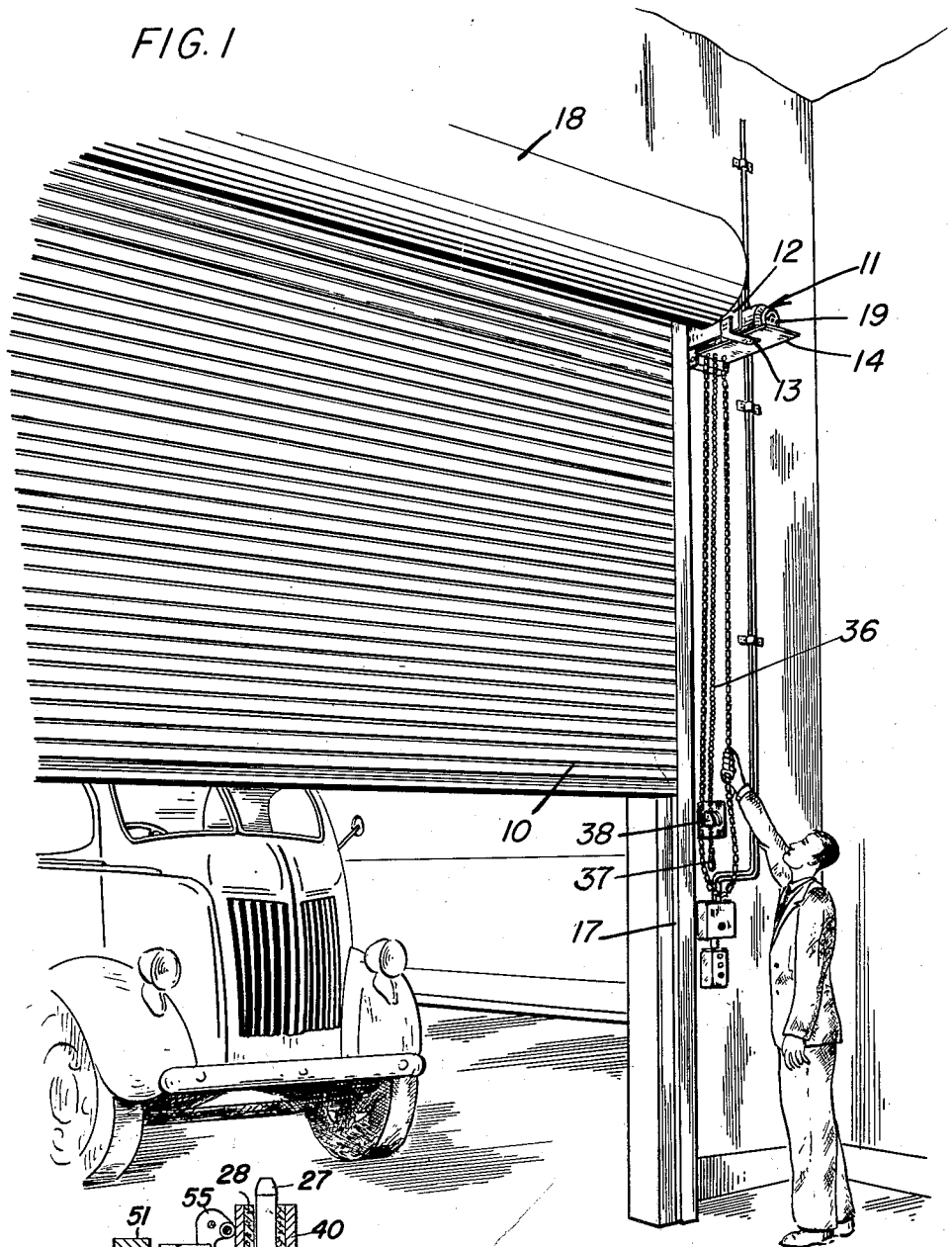
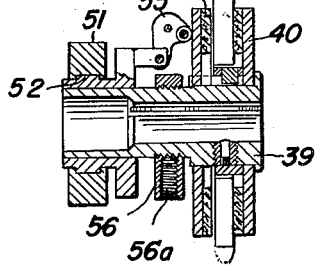
FIG. 7
Inventor
Herbert H. Stevens, Jr.
By Lucke & Lucke
Agents.

Feb. 23, 1954     H. H. STEVENS, JR     2,670,065
COMBINED BRAKE AND CLUTCH FOR MOTOR DRIVE
Filed April 7, 1949     3 Sheets-Sheet 2
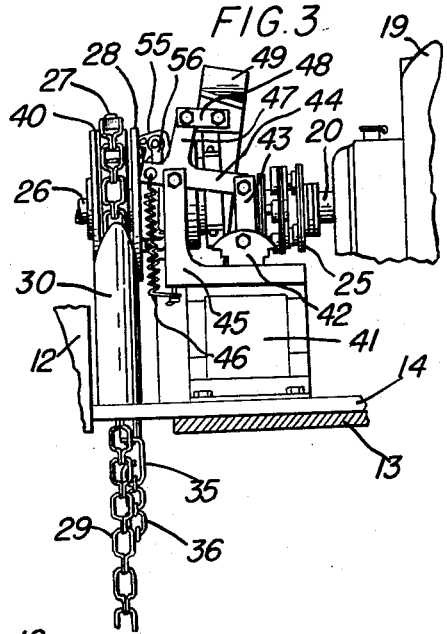
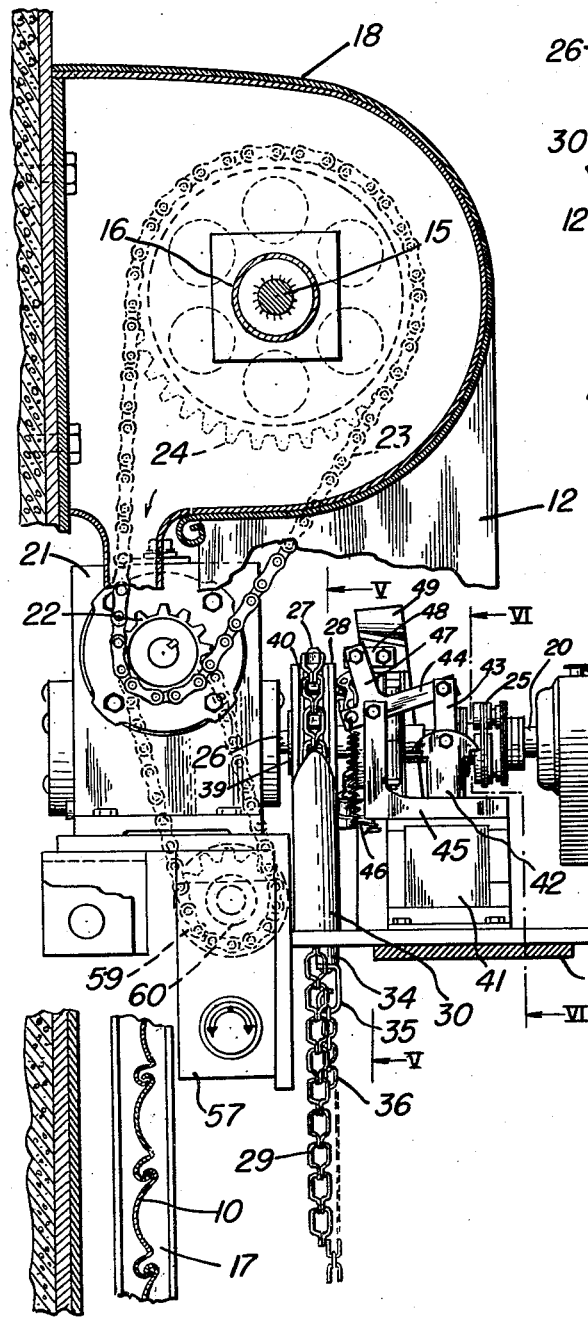
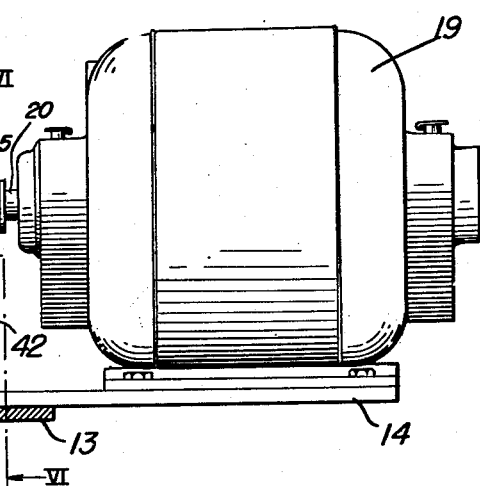
*Inventor*
*Herbert H. Stevens, Jr.*
By *Lucke + Lucke*
*Agents.*

Feb. 23, 1954     H. H. STEVENS, JR     2,670,065
COMBINED BRAKE AND CLUTCH FOR MOTOR DRIVE
Filed April 7, 1949     3 Sheets—Sheet 3
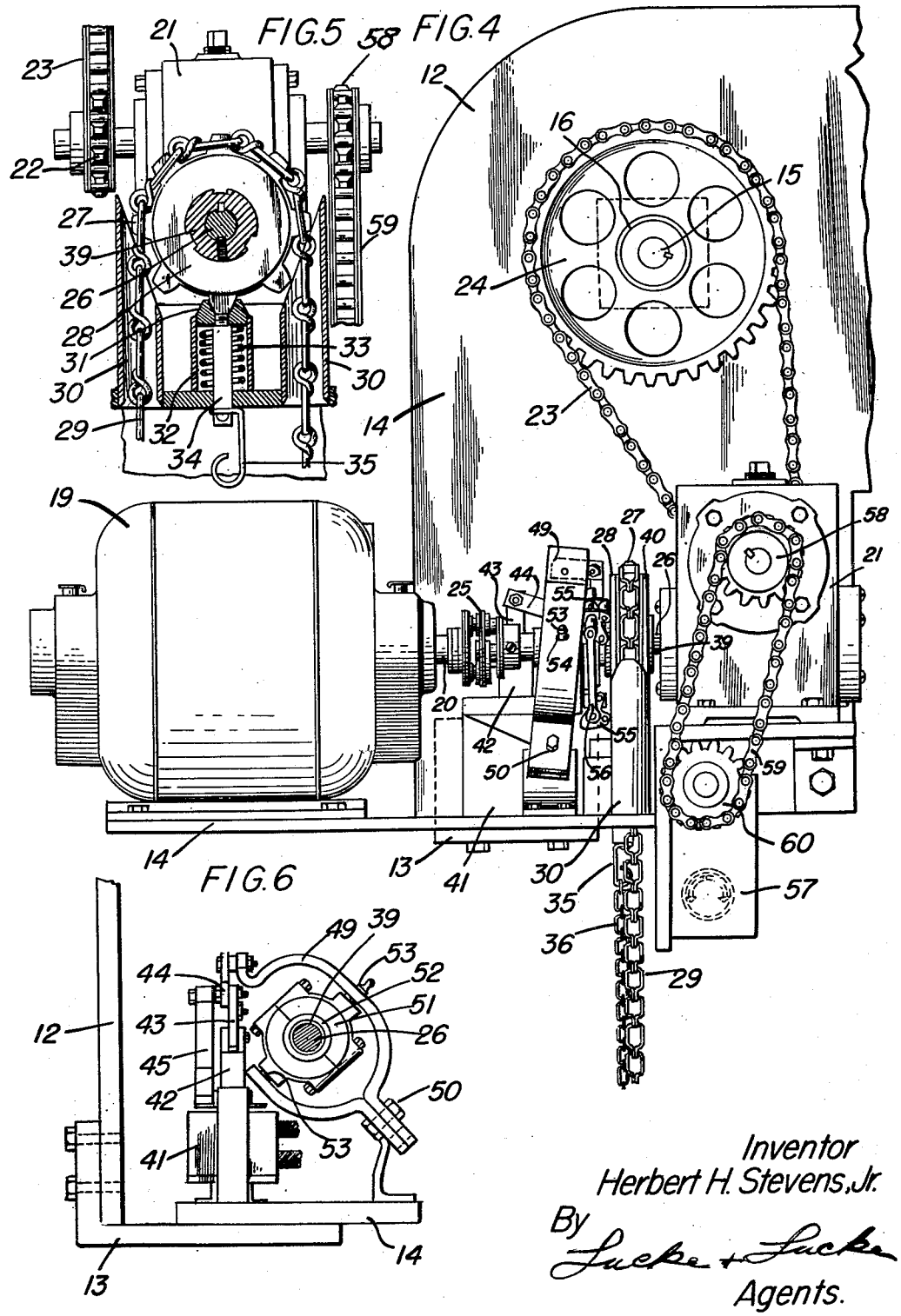
Inventor
Herbert H. Stevens, Jr.
By Lucke + Lucke
Agents.

Patented Feb. 23, 1954

2,670,065

UNITED STATES PATENT OFFICE 2,670,065

COMBINED BRAKE AND CLUTCH FOR MOTOR DRIVES

Herbert H. Stevens, Jr., New York, N. Y., assignor to Walter Balfour & Co., Inc., New York, N. Y., a corporation of New York Application April 7, 1949, Serial No. 86,009

10 Claims. (Cl. 192—18)

This invention relates to a motor drive, and more particularly to a combined brake and clutch for use with a motor drive. The invention is especially useful in its application to operation of a rolling door, to which use, however, it is not restricted.

In motor-driven apparatus, it is often desirable to brake rotation of the motor shaft when the current is shut off, in order to prevent appreciable over-running of the apparatus and to prevent creep or further movement. It is also desirable in many instances to operate the apparatus manually, in making final adjustments in position after the motor has been stopped, or for operation in case of failure of the electrical power. Heretofore this has called for complicated and expensive apparatus, as separate brakes, clutches, hand operating means and the like, with special shaft extensions for mounting such apparatus.

I have found that a very simple combined brake and clutch may be employed to stop rotation of the motor shaft when the operating current is shut off, and to make it possible at once to operate the apparatus manually. This combined brake and clutch does not require a specially built motor or other complicated equipment.

According to the invention, a friction element is splined upon the motor shaft; and, in order to brake rotation of the motor shaft, this element is moved and held against an adjacent element which is locked against rotation. Such adjacent element may be a manually operable wheel mounted for idling upon the motor shaft and locked against rotation. Employing such a wheel, it is possible not only to brake the motor shaft as described, but also to rotate the motor shaft by hand. The latter operation requires only that the splined friction element be held tightly against the wheel, that the wheel be unlocked, and that the wheel be manually operated with the motor "dead."

One form of the invention is illustrated by way of example in the accompanying drawings, in which—

Fig. 1 is a perspective view showing the invention applied to a rolling door;

Fig. 2 is a broken elevation, with certain parts cut away, showing the apparatus as viewed from the left at the top of Fig. 1;

Fig. 3 is a broken elevation of the parts shown centrally in Fig. 2, with certain of these parts in different position;

Fig. 4 is a broken elevation of the apparatus illustrated in Fig. 2 as viewed from the opposite direction;

Fig. 5 is a section taken on the line V—V of Fig. 2 shown on a somewhat enlarged scale;

Fig. 6 is a cross-section taken on the line VI—VI of Fig. 2; and

Fig. 7 is a longitudinal mid-cross section through the combined brake and manual drive clutch illustrated in Figs. 2, 3 and 4.

In the embodiment of the invention which is illustrated in the drawings, there is shown a rolling door, comprising a curtain 10 of conventional construction and a motor drive 11 for raising and lowering the curtain. The curtain is supported by brackets, as the bracket 12, on opposite sides of the doorway above its top, and the motor drive 11 is ordinarily carried by one of these brackets, as illustrated in Fig. 1. Thus, in the illustrated embodiment, an angle 13 is fixed to the bracket 12 and carries a base plate 14, upon which the motor drive is carried, all in a manner later to be particularly described. Obviously, the motor drive might be otherwise mounted.

The curtain 10 is carried by a horizontal shaft 15 which is journaled in the bracket 12 above the top of the doorway. It is desirable to coil the curtain upon an element having a larger diameter than that of the shaft 15. Accordingly, a curtain pipe 16 is fixed coaxially to the shaft 15 for rotation therewith and the curtain is rolled upon this curtain pipe. The curtain pipe 16 is of well-known construction containing helical torsion springs (not shown) which serve to counterbalance to a considerable degree the unbalanced increasing weight of the curtain as it unrolls to effect a diminishing radius of weight application while the curtain is being lowered. The door is constrained to sliding movement in vertical channels, as the channel 17, in the vertical members of the doorway frame. A suitable protective hood 18 is shown as covering that part of the door which is rolled upon the curtain pipe 16.

The curtain is raised or lowered by rotating the horizontal shaft 15. This is the function of the motor drive.

The motor drive 11 comprises a motor 19 having a single shaft extension 20 from which the rest of the motor drive is operated. The shaft extension connects the armature of the motor with a speed reducing unit 21, the output sprocket 22 of which is connected by a sprocket chain 23 with a second sprocket 24 which is fixed to the horizontal shaft 15 of the curtain. Thus, rotation of the shaft extension 20 rotates the horizontal shaft 15, raising or lowering the curtain 10, according to the direction in which the motor 19 is operated. The shaft extension 20 is shown as connected by a self-aligning coupling 25 to an extended reducer shaft 26 of the speed reducing unit 21. From the foregoing it will be apparent that the shaft extension 20 and its connected elements are continuously connected to the power unit and to the load.

A manually operable wheel, here shown as a sprocket wheel 27, is mounted upon the extended reducer shaft 26 for idling thereon. A friction disc 28 is splined to the reducer shaft 26 adjacent the sprocket wheel 27, and means (later to be described) is carried by the shaft for pressing the splined friction disc against the sprocket wheel. Thus, with the friction disc 28 tightly pressed against the sprocket wheel 27, the reducer shaft 26 and the sprocket wheel will rotate together. An endless sprocket chain 29 is operatively associated with the sprocket wheel 27 and extends through suitable openings in the base plate 14 to a convenient location for manual operation. See Fig. 1. Tubular chain guards 30, 30 may be fixed to the upper face of the base plate 14 to surround the chain 29 for a short distance above the base plate and to guide it positively onto the sprocket wheel 27. It is thus possible, with the motor dead and the friction disc 28 tightly pressed against the sprocket wheel 27, to move the sprocket chain 29 and thereby to rotate the reducer shaft 26 manually.

If, on the other hand, the motor is running and the sprocket wheel 27 is locked against rotation, the splined friction disc 28 may be pressed against the sprocket wheel to brake rotation of the motor shaft. A stop 31 is accordingly provided for positively locking the sprocket wheel 27 against rotation in both directions. As here shown, the stop 31 comprises a tapered member which may project between adjacent teeth of the sprocket wheel or which may engage a single tooth of the wheel in a groove in its forward end. See Fig. 5. The stop 31 is carried in a slideway 32 immediately beneath the sprocket wheel, toward which it is urged by a spring 33 within the slideway. A tie is provided for withdrawing the stop 31 from locking position against the action of the spring 33. Thus, a stem 34 is fixed to the stop 31 extending centrally through the slideway 32, beyond which it is fixed to a hook 35. A pull chain 36 is connected at its end to the hook 35, continuing downwardly therefrom to a position of easy access adjacent the lower part of the doorway. See Fig. 1. Consequently, a pull upon the chain 36 will disengage the stop 31 from the sprocket wheel 27, which may then turn freely upon the shaft extension 26. In order to hold the stop out of engagement with the sprocket wheel 27, a handle 37, or the lower end of the pull chain, may be hooked in a catch 38 suitably fixed adjacent the doorway.

In the embodiment illustrated, a clutch body 39 is fixed to the reducer shaft 26 being keyed thereto against rotation and pinned thereto against axial sliding. Two splined friction discs are employed; one on each side of the sprocket wheel 27, in order to increase the frictional contact between the reducer shaft and the wheel. Accordingly, a second friction disc 40 is splined to the clutch body 39 on the side of the sprocket wheel opposite to that adjacent which the friction disc 28 is disposed. The second friction disc 40 is flexibly movable, but restrained by the splines from rotation on the clutch body, and its axial movement is suitably limited, as by a shoulder on the clutch body. Thus, when the friction disc 28 is pressed against the wheel 27, the wheel moves slightly with the splined friction disc and presses against the restrained friction disc 40.

Although the friction elements are here particularly described as discs, obviously they are not necessarily constructed as discs, but may be formed in other convenient shape.

From the foregoing, operation of the apparatus as so far described will be easily understood. The clutch body 39 being rotated by the motor and the sprocket wheel being locked by the stop 31, movement of the splined friction disc 28 to contact the locked sprocket wheel will produce braking friction thereon, which will tend to decelerate the clutch body 39 to which the disc 28 is splined, together with all moving elements of the motor system. With the friction disc 40 restrained to the clutch body, on the opposite side of the sprocket wheel 27 from that adjacent the splined friction disc 28, braking friction will be applied to both sides of the sprocket wheel as the splined disc is pressed against it. Furthermore, with the motor dead and one or both friction discs held firmly against the sprocket wheel, the reducer shaft 26 and the elements connected thereto may be operated by hand. It is merely necessary to exert a pull upon the pull chain 36, thus disengaging the stop 31, and then to pull the sprocket chain 29 in desired direction.

The means for pressing the splined friction disc 28 against the wheel 27 is slipping means slidable axially of the shaft, and will now be described. A solenoid 41 is fixed to the base plate 14 beneath the extended reducer shaft 26; and the armature 42 of the solenoid is movable vertically thereof extending above its coil. A link 43 is pivoted at one end to the armature 42 and at the other end to a generally horizontal lever 44 which is in turn pivoted to a support 45 suitably fixed to the apparatus. The end of the lever 44 opposite to that which is pivoted to the link 43, is connected to a spring 46. The spring 46 and the armature 42 are so constructed and arranged that one opposes the other in its action upon the lever 44. A projection 47 is fixed to the lever 44 and extends at substantially right angles thereto. A short link 48 connects the projection 47 with a yoke 49 which is pivoted as at 50 with respect to the base plate 14. Thus, movement of the lever 44 in one direction moves the yoke 49 correspondingly about its pivot 50; and movement of the lever in the opposite direction moves the yoke oppositely.

The solenoid 41 is so designed that it will act to overcome the effect of the spring 46 upon the lever 44. See Fig. 3. However, when the solenoid is not energized, the lever 44 will act under the sole influence of the spring 46. See Fig. 2. A split ring 51 is mounted for free rotation upon a collar 52, which in turn is mounted upon the clutch body 39 for rotation therewith and axial movement thereon. The split ring 51 is operatively connected to the yoke 49 by unitary trunnions 53, 53 on the former which project through elongated slots 54, 54 in the yoke. Suitably connected to the collar 52 are a plurality of bell crank levers 55 pivoted in a frame 56. The frame 56 is threadedly mounted upon the clutch body 39, with respect to which the frame may be axially adjusted by rotation. When in desired position upon the clutch body, the frame may be fixed thereto by a set screw 56a. See Fig. 7. The bell crank levers 55 are so constructed and arranged that as the split ring 51 moves toward the friction disc 28, the bell crank levers will be caused to press against the friction disc and urge it to bear upon the sprocket wheel 27.

The solenoid 41 is preferably connected in the motor circuit (not shown) and when the motor is energized, the solenoid will also be energized. Upon energization of the solenoid 41, its armature 42 is drawn inwardly thereof thereby acting upon the link 43, the lever 44 and the train of elements connected thereto, to move the split ring 51 away from the splined friction disc 28. The friction disc is not then pressed against the sprocket wheel 27. See Fig. 3. When the motor circuit is broken, however, the solenoid 41 ceases to be energized and its armature 42 is not then drawn inwardly thereof. (See Fig. 2.) Thereupon, the spring 46 acts upon the lever 44, moves oppositely and through the connected train of apparatus, causes the bell crank levers 55 to bear upon the splined friction disc 28 and press it against the sprocket wheel 27. Thus, the extended reducer shaft 26 is braked immediately energization of the motor 19 ceases. When an opposite friction disc 40 is fastened to the shaft, pressure of the splined disc 28 upon the sprocket wheel 27 gives the latter slight axial movement and causes braking friction to be exerted upon the sprocket wheel by both friction discs. Accordingly, the friction disc or friction discs will always bear upon the sprocket wheel when the motor ceases to be energized.

In order to prevent damage to the rolling door through rotation of the horizontal shaft 15 beyond the point where the door is completely rolled up or completely rolled into closed position, the usual limit switch 57 is provided for breaking the motor circuit at the proper times. With the solenoid 41 connected in series in the motor circuit, the limit switch 57 will break the circuit through the solenoid at the same time that it breaks the circuit through the motor, thereby applying the brake. The limit switch is conveniently operated from a sprocket 58 through a sprocket chain 59 passing over a second sprocket 60 connected to the limit switch. As is well known, such apparatus may be set to break a circuit after a given number of revolutions of its shaft. Furthermore, the details of the limit switch itself and its electrical connections are standard and are not here illustrated because such illustration would unduly complicate the drawings. The limit switch forms no part of the present invention.

The particular form of the invention here described and illustrated in the accompanying drawings is presented merely as an example of how the invention may be applied. Moreover, it is to be understood that the phraseology and terminology employed herein is for the purpose of description and not of limitation. Other forms, embodiments and applications of the invention coming within the proper scope of the appended claims will readily suggest themselves to those skilled in the art.

I claim:

1. In a motor drive, a rotatable shaft continuously connected to the power unit and the load, a clutch body fixed to said shaft against rotation and against axial sliding, and a combined unitary brake and manual drive clutch for said shaft comprising a manually operable wheel mounted upon said clutch body for idling thereon, a stop for positively locking said wheel against rotation in both directions, a friction element splined to said clutch body adjacent said wheel, and slipping means slidable axially of said shaft for pressing said element against said wheel to brake rotation of said shaft by contact with said wheel when said wheel is locked and to fix said shaft to said wheel for motion therewith when said wheel is unlocked.

2. In a motor drive, a rotatable shaft continuously connected to the power unit and the load, a clutch body fixed to said shaft against rotation and against axial sliding, and a combined unitary brake and manual drive clutch for said shaft comprising a sprocket wheel mounted upon said clutch body for idling thereon, a stop for positively locking said sprocket wheel against rotation in both directions, a friction element splined to said clutch body adjacent said sprocket wheel, and slipping means slidable axially of said shaft for pressing said friction element against said sprocket wheel to brake rotation of said shaft by contact with said sprocket wheel and to fix said shaft to said sprocket wheel for motion therewith when said sprocket wheel is unlocked.

3. In a motor drive, a rotatable shaft continuously connected to the power unit and the load, a clutch body fixed to said shaft against rotation and against axial sliding, and a combined unitary brake and manual drive clutch for said shaft comprising a sprocket wheel mounted upon said clutch body for idling thereon, a stop for positively locking said sprocket wheel against rotation in both directions, a friction disc splined to said clutch body adjacent said sprocket wheel, and slipping means slidable axially of and operable independently of said shaft for pressing said friction disc against said sprocket wheel to brake rotation of said shaft by contact with said sprocket wheel and to fix said shaft to said sprocket wheel for motion therewith when said sprocket wheel is unlocked.

4. In a motor drive, a rotatable shaft continuously connected to the power unit and the load, a clutch body fixed to said shaft against rotation and against axial sliding, and a combined unitary brake and manual drive clutch for said shaft comprising a sprocket wheel mounted upon said clutch body for idling thereon, a stop for positively locking said sprocket wheel against rotation in both directions, a friction disc splined to said clutch body adjacent said sprocket wheel, and slipping means partly carried by said clutch body and slidable axially thereof for pressing said friction disc against said sprocket wheel to brake rotation of said shaft by contact with said sprocket wheel and to fix said shaft to said sprocket wheel for motion therewith when said sprocket wheel is unlocked.

5. In a motor drive, a rotatable shaft continuously connected to the power unit and the load, a clutch body fixed to said shaft against rotation and against axial sliding, and a combined unitary brake and manual drive clutch for said shaft comprising a sprocket wheel mounted upon said clutch body for idling thereon, a stop for positively locking said sprocket wheel against rotation in both directions, and a friction element restrained upon said clutch body on one side of said sprocket wheel, in combination with a second friction element splined to said clutch body on the other side of said sprocket wheel, and slipping means slidable axially of said shaft for pressing said splined friction element toward said first-named friction element to brake rotation of said motor shaft by contact with said sprocket wheel and to fix said shaft to said sprocket wheel for motion therewith when said sprocket wheel is unlocked.

6. In a motor drive, a rotatable shaft continuously connected to the power unit and the load, a clutch body fixed to said shaft against rotation and against axial sliding, a combined unitary brake and manual drive clutch comprising a sprocket wheel mounted upon said clutch body for idling thereon, a stop for positively locking said sprocket wheel against rotation in both directions, and a friction element restrained upon said clutch body on one side of said sprocket wheel, in combination with a second friction element splined to said clutch body on the other side of said sprocket wheel, and slipping means slidable axially of and operable independently of said shaft for pressing said second friction element toward said first-named friction element to brake rotation of said motor shaft by contact with said sprocket wheel and to fix said shaft to said sprocket wheel for motion therewith when said sprocket wheel is unlocked.

7. In a motor drive, a rotatable shaft continuously connected to the power unit and the load, a clutch body fixed to said shaft against rotation and against axial sliding, a combined unitary brake and manual drive clutch comprising a sprocket wheel mounted upon said clutch body for idling thereon, a stop for positively locking said sprocket wheel against rotation in both directions, and a friction disc restrained upon said clutch body on one side of said sprocket wheel, in combination with a second friction disc splined to said clutch body on the other side of said sprocket wheel, and slipping means partly carried by and slidable axially of said clutch body for pressing said splined friction disc toward said first-named friction disc to brake rotation of said motor shaft by contact with said sprocket wheel and to fix said shaft to said sprocket wheel for motion therewith when said sprocket wheel is unlocked.

8. In a motor drive, a rotatable shaft continuously connected to the power unit and the load, a clutch body fixed to said shaft against rotation and against axial sliding, and a combined unitary brake and manual drive clutch comprising a sprocket wheel mounted upon said clutch body for idling thereon, a stop for positively locking said sprocket wheel against rotation in both directions, and a friction disc restrained upon said clutch body on one side of said sprocket wheel, in combination with a second friction disc splined to said clutch body on the other side of said sprocket wheel, slipping means slidable axially of said shaft for pressing said splined friction disc toward said first-named friction disc, a spring for actuating said pressing means and a solenoid acting in opposition to said spring to release said means, said pressing means causing said friction discs to brake rotation of said shaft by contact with said sprocket wheel and to fix said shaft to said sprocket wheel for motion therewith when said sprocket wheel is unlocked.

9. In a motor drive, a rotatable shaft continuously connected to the power unit and the load, a clutch body fixed to said shaft against rotation and against axial sliding, and a combined unitary brake and manual drive clutch comprising a sprocket wheel mounted upon said clutch body for idling thereon, a sprocket chain operatively associated with said wheel for hand operation thereof, a stop spring-urged to lock said sprocket wheel positively against rotation, a tie for withdrawing said stop from locking position against the action of said springs, and a friction disc splined to said clutch body on one side of said sprocket wheel, in combination with a second friction disc splined to said clutch body on the other side of said sprocket wheel, and slipping means slidable axially of said shaft for pressing said second friction disc toward said first-named friction disc, a spring for actuating said pressing means, and a solenoid acting in opposition to said spring to release said means, said pressing means causing said friction discs to brake rotation of said shaft by contact with said sprocket wheel for motion therewith when said sprocket wheel is unlocked, substantially as described.

10. In a motor drive, a shaft continuously connected to the power unit and the load, a clutch body fixed to said shaft against rotation and against axial sliding, a friction disc restrained upon said clutch body, and a second friction disc splined to said clutch body, in combination with a manually operable wheel disposed between said discs in idling relationship to said shaft and having limited axial movement upon said clutch body, a releasable stop for positively locking said wheel against rotation in both directions, and slipping means slidable axially of said shaft for pressing said second friction disc toward said first-named friction disc to brake rotation of said shaft when said wheel is locked and to cause rotation of said shaft with said wheel when said wheel is unlocked.

HERBERT H. STEVENS, Jr.

References Cited in the file of this patent

UNITED STATES PATENTS

| Number | Name | Date |
|---|---|---|
| 822,452 | Hitner | June 5, 1906 |
| 1,444,737 | Fraley | Feb. 6, 1923 |
| 1,668,880 | Vallen | May 8, 1928 |
| 1,833,648 | Johnson | Nov. 24, 1931 |
| 2,390,117 | Michelman | Dec. 4, 1945 |
| 2,417,855 | Barish | Mar. 25, 1947 |

FOREIGN PATENTS

| Number | Country | Date |
|---|---|---|
| 715,749 | France | Dec. 8, 1931 |